(12) United States Patent
Bacchi et al.

(10) Patent No.: US 11,833,715 B2
(45) Date of Patent: Dec. 5, 2023

(54) METHOD AND PLANT FOR RECYCLING THE INFILL OF SYNTHETIC TURVES

(71) Applicant: 100% TURFRECYCLERS SRL, Parma (IT)

(72) Inventors: Luca Bacchi, Parma (IT); Sara Costa, Parma (IT)

(73) Assignee: 100% TURFRECYCLERS SRL, Parma (IT)

( * ) Notice: Subject to any disclaimer, the term of this patent is extended or adjusted under 35 U.S.C. 154(b) by 0 days.

(21) Appl. No.: 17/712,620

(22) Filed: Apr. 4, 2022

(65) Prior Publication Data

US 2023/0311367 A1 Oct. 5, 2023

(51) Int. Cl.
| | | |
|---|---|---|
| *B29B 17/02* | (2006.01) | |
| *B07B 13/07* | (2006.01) | |
| *B07B 1/12* | (2006.01) | |

(52) U.S. Cl.
CPC ............... *B29B 17/02* (2013.01); *B07B 1/12* (2013.01); *B07B 13/07* (2013.01); *B29B 2017/0203* (2013.01); *B29B 2017/0224* (2013.01); *B29B 2017/0258* (2013.01); *B29B 2017/0265* (2013.01)

(58) Field of Classification Search
CPC ............ B29B 17/02; B29B 2017/0203; B29B 2017/0224; B29B 2017/0258; B29B 2017/0265; B07B 1/12; B07B 13/07
See application file for complete search history.

(56) References Cited

U.S. PATENT DOCUMENTS

| | | | | |
|---|---|---|---|---|
| 4,504,386 | A * | 3/1985 | Dyren | B07B 1/46 |
| | | | | 209/396 |
| 9,789,516 | B2 * | 10/2017 | Andersen | B07B 9/02 |
| 11,597,121 | B2 * | 3/2023 | Wilson | B07B 1/18 |
| 2012/0031814 | A1 * | 2/2012 | Hinkel | E01C 13/08 |
| | | | | 209/3 |
| 2015/0108041 | A1 * | 4/2015 | Andersen | E01C 13/08 |
| | | | | 209/3.1 |
| 2016/0067745 | A1 * | 3/2016 | Andersen | B29B 17/02 |
| | | | | 209/21 |
| 2022/0009129 | A1 * | 1/2022 | Owegeser | B02C 23/08 |

\* cited by examiner

*Primary Examiner* — Michael McCullough
*Assistant Examiner* — Kalyanavenkateshware Kumar
(74) *Attorney, Agent, or Firm* — Browdy and Neimark, PLLC

(57) ABSTRACT

A method is described for recycling the infill of a synthetic turf, said infill being formed by a plurality of different granular materials, including at least sand granules, polymeric material granules and synthetic grass filaments, said method comprising the following steps: drying the infill, screening the infill through a plurality of successive screens (130,140,180,185) each having passage holes of different sizes subdividing the infill into a plurality of groups of granular material having different size ranges, separating each group of granular material into two subgroups of granular material based on the difference in density of the materials, and conveying the separated subgroups of granular materials to different collection containers.

14 Claims, 9 Drawing Sheets

METHOD AND PLANT FOR RECYCLING THE INFILL OF SYNTHETIC TURVES

TECHNICAL FIELD

The present invention relates to a plant for separating different granular materials mixed together. In particular, the plant according to the invention is designed for recycling the infill of synthetic turves consisting of at least sand, rubber granules and synthetic grass filaments.

PRIOR ART

As is known, synthetic turf usually comprises a mat made of polymer material onto which a plurality of filaments of synthetic grass is fixed, i.e. made of polymer material, onto which an infill is distributed which has the task of partially filling the space between the blades of synthetic grass to make them more stable and to make the turf more realistic.

The infill is substantially a granular mixture obtained by means of mixing sand, frequently sands of different diameters, dust and rubber granules (generally recycled or thermoplastic rubber). Such granular mixture is interspersed between the blades of synthetic grass also granting the functional characteristics of elasticity, reliability and safety to the synthetic turf.

With wear, the synthetic turf must be replaced with a new one. A known problem due to wear and tear is that the synthetic grass filaments detach from the mat and end up in the infill, making it even more complicated to separate the materials. In addition, synthetic grass filaments are made of valuable materials and therefore it is preferable to recover as much of them as possible.

The object of the present invention is that of making available a system that allows the removal of broken filaments of synthetic grass (when present) and the separation of the infill into its original components so as to allow the real re-use of the raw materials of which the infill is comprised.

Such object is achieved by the features of the invention indicated in the independent claims. The dependent claims outline preferred and/or particularly advantageous aspects of the invention.

DISCLOSURE OF THE INVENTION

The invention, particularly, makes available a method for recycling the infill of a synthetic turf, said infill being formed by a plurality of different granular materials, including at least sand granules, polymeric material granules and synthetic grass filaments, said method comprising the following steps:
  drying the infill (i.e. the assembly of granular material), e.g. by a flow of hot air,
  screening the infill through a plurality of successive screens each having calibrated holes of different sizes, subdividing the infill into a plurality of groups of granular material having different size ranges,
  separating each group of granular material into (at least) two subgroups of granular material (each of these subgroups being of one material type) on the basis of the difference in density of the materials,
  conveying the separate subgroups of granular materials to different collection containers.

This solution makes available a method for recycling the infill that is more efficient than methods of the prior art.

According to an aspect of the invention, during the steps of drying, screening and separating according to the difference in density of the materials, the step of suctioning the synthetic grass filaments can be performed.

Synthetic grass filaments have a lower density than sand and polymer granules, so suction allows efficient separation of the filaments from the rest of the granular material. Carrying out this suction in all of the said steps allows the greatest possible amount of filaments to be recovered.

According to another aspect of the invention, the method may comprise the step of conveying at least one group of screened granular material along a chute comprising:
  a plurality of bars parallel to each other and spaced apart by a predetermined amount,
  a plurality of rods rising vertically from the bars to form a comb transverse to an advancement direction of the subgroup of granular material along the chute,
  a suction device positioned at the rod assemblies In this way it is possible to effectively separate the synthetic grass filaments that tend to be stopped by the comb(s) and subsequently, or simultaneously, suctioned by the suction device, while the rest of the granular material falls by gravity into the passageways between the bars.

According to yet another aspect of the invention, the rods are made of an electrically insulating material and are connected to a positive and a negative pole of an electrical power source.

This generates an electrostatic charge on the comb that acts like a magnet for the turf filaments which, being made of polymeric material, such as polypropylene, polyethylene or PVC, tend to be attracted by the electrostatic charge and stop more easily against the rods. As a result, the comb is more effective in retaining synthetic turf filaments. The concept of the invention may therefore be extended to a method independent from claim 1, and comprising only the above-described chute (wherein the remainder of the description it will be described in more detail as a separating machine).

The method may also comprise the step of increasing the suction force once all the infill except the filaments have passed through the bars, in order to suction filaments blocked by the rods, by mechanical and/or combined mechanical and electrostatic action, suctioning those not previously suctioned.

In order to further improve the detachment of the retained filaments from the rods, an aspect of the invention may provide that the rods are internally hollow and provided with at least one hole, preferably a plurality of holes, which places the internal cavity in communication with the external environment. In that case, the method involves cyclically emitting a flow of pressurised gas through said holes, which can also be made to direct the gas flow upwards.

For generating the flow of pressurised gas, said cavity may be connected to a pressurised gas source by means of a solenoid valve configured to cyclically open and close, in order to generate timed gas flows.

According to a further aspect of the invention, the steps of drying and screening in subgroups occur simultaneously.

This shortens the infill processing time.

Regardless of whether these steps occur simultaneously, the screening step may take place by means of a screening machine of the rotating drum type having a cylindrical screen placed in rotation with respect to an axis of rotation substantially coaxial to an axis, or of the type comprising a flat screen inclined with respect to a horizontal plane.

In the case of a screening machine with an inclined flat screen, the screening machine may comprise a plurality of rod assemblies rising vertically from the inclined screen to form a comb transverse to an advancement direction of the subgroup of granular material along said screen.

These rods have the same effect as those described in the chute and can also be made of an electrically insulating material and be connected (individually or all together if the comb is in one piece) to a positive and a negative pole of an electrical power source The invention may further provide that the step of separating by density may envisage the use of a densimetric separating machine having a densimetric table above which a suction mouth is positioned, connected to a suction unit whose power is adjustable, and wherein the method comprises:

separating the sand from the polymeric material granules of the group of granular materials by means of the densimetric table while maintaining the power of the suction unit at a first predetermined threshold value at which the synthetic grass filaments float to a predetermined vertical height, once the separation of the sand from the polymeric material granules has been completed and the said materials have been conveyed outside the separating machine, operating the suction unit at a second predetermined power value higher than the first value in order to suck and convey towards an outlet the synthetic grass filaments that in the previous step were floating above the densimetric table at the predetermined vertical height.

Thanks to this solution, the amount of grass filaments in the other two groups of granular material can be reduced to a minimum, thus substantially reducing the pollution rate of the materials and increasing their reusability.

According to another aspect of the invention, sand and polymer granules are conveyed out of the separating machine by means of rotary valves.

In this way it is possible, with the same suction force generated, to reduce the size of the suction unit of the suction hood compared to the use of a standard densimetric table in which the separated materials fall through inlets in free communication with the external environment and/or a material collection tank.

The invention further provides a method for recycling a roll of a synthetic turf strip having a mat to which a plurality of synthetic grass filaments are attached and between which is an infill, said infill being formed by a plurality of different granular materials including at least sand granules, polymeric material granules and synthetic grass filaments, said method comprising the following steps:

unrolling the strip of synthetic turf, mechanically removing the infill from the strip of synthetic turf, collecting the removed infill and rolling up the strip of synthetic turf again, drying the infill by a flow of hot air, screening the infill through a plurality of successive screens each having different calibrated passage holes by subdividing the infill into a plurality of groups of granular material having different size ranges, separating each group of granular material into two subgroups based on the difference in density of the materials, conveying separate subgroups of granular materials to different collection containers.

Preferably, this method may include the step of removing the synthetic grass filaments from the mat between the step of rolling up the strip of synthetic turf again and the step of removing the infill from the strip of synthetic turf.

In devices of the prior art, after the removal of the infill, the mats are generally shredded together with the filaments, which makes it impossible to recover the valuable polymeric material of the filaments without having to use complicated means of sorting between granules of shredded mat and granules of shredded synthetic grass filaments. The proposed solution, which is worthy of protection independently from the rest of the infill processing method, allows the synthetic grass filaments to be recovered quickly and efficiently. The invention therefore also makes available only the method of removing the infill and filaments from the strip of synthetic turf, without the subsequent processing of the infill (drying, screening and separation according to density).

According to one aspect of the invention, the step of removing the synthetic grass filaments from the mat may comprise the step of stretching a portion of the strip, at which the removal takes place, while the removal takes place.

According to another aspect of the invention, the removal may be carried out by a filament cutting operation, for example by means of a rotary blade or a hot wire (placed along an advancement direction of the strip).

According to a further aspect of the invention, the step of suctioning the removed synthetic grass filaments may be envisaged during the step of removing the synthetic grass filaments.

As mentioned above, the concept of the use of rods may be worthy of protection independently from the characteristics of claim 1. The invention therefore also makes available a method for recycling the infill of a synthetic turf, wherein said infill comprises synthetic grass filaments, said method comprising the step of making available a plurality of rods, which are arranged vertically, are made of an electrically insulating material and are connected to a positive pole and a negative pole of an electrical power source. The method also includes the step of hitting said plurality of rods with a flow (of a predetermined amount) of infill containing synthetic grass filaments. By doing so, the rods which have been made electrostatic attract and retain at least some of the synthetic grass filaments contained in the flow of infill.

The method may also include the step of making a suction unit available and activating the suction unit at a predetermined power to suction the synthetic grass filaments retained by the rods (e.g. said rods being of the type illustrated and described in FIG. 9).

This suction can take place both during, but especially after, the plurality of rods have been hit with the predetermined amount of infill.

The method can be applied to any step in a method for recycling an infill containing synthetic grass filaments and can be applied to any machine of said infill that provides for infill transport (e.g. by gravity).

BRIEF DESCRIPTION OF THE DRAWINGS

Further features and advantages of the invention will be more apparent after reading the following description provided by way of non-limiting example, with the aid of the accompanying drawings.

BEST MODE TO IMPLEMENT THE INVENTION

Figure 1:
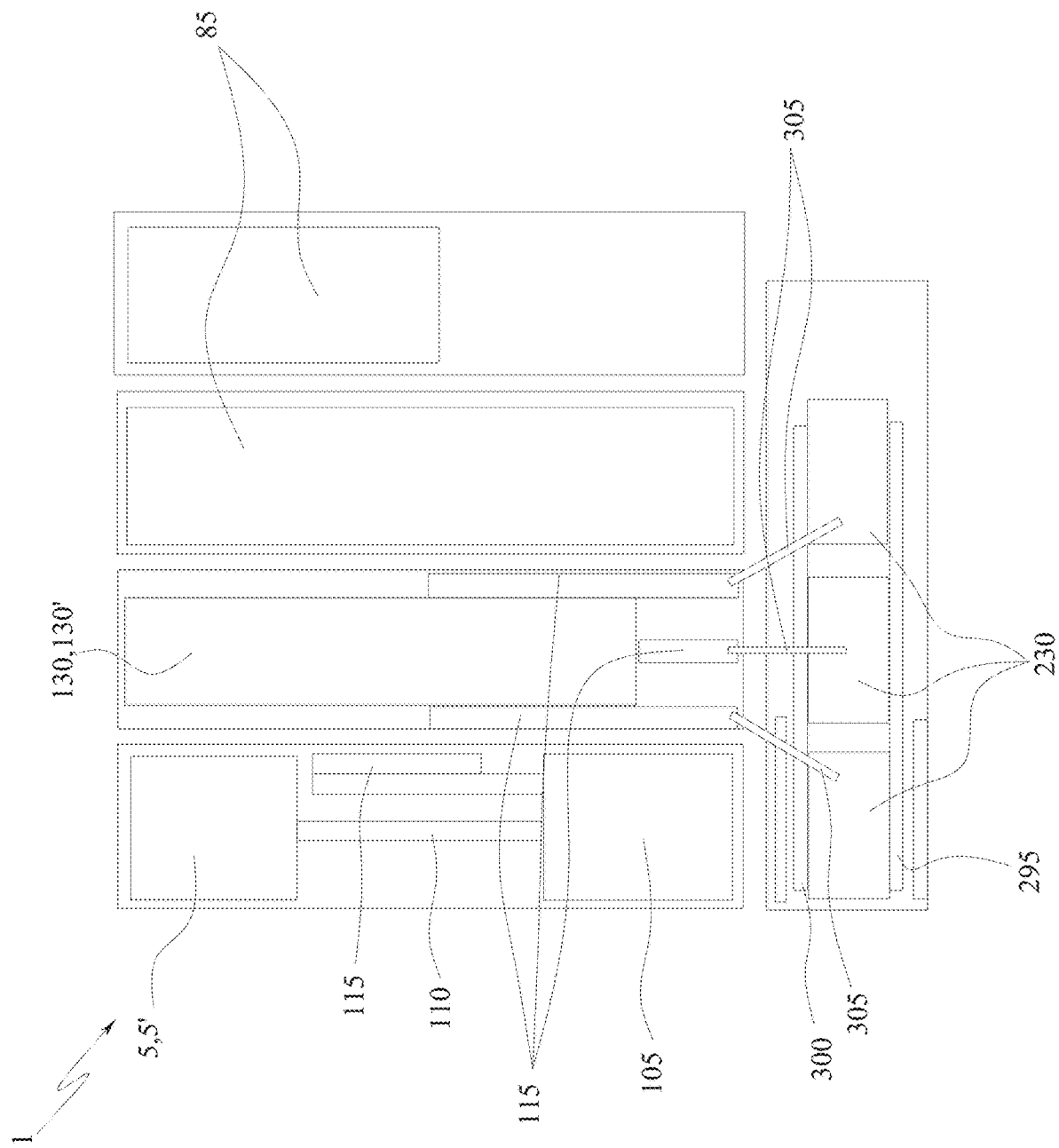
FIG. 1 is a schematic plan view of a system according to the invention.

With particular reference to such figures, 1 indicates overall a disposal and recycling system of the infill present in strips of synthetic turf. More in particular, the system 1 is configured to separate the infill into the different materials of which it is comprised. The plant can also be configured to remove the infill from the strip of synthetic turf N in which it is contained. In addition, the system can also be configured to detach the filaments F of synthetic turf still attached to it from the mat, for example after the removal of the infill therefrom (in the figures, the filaments are schematically shown as tufts of grass for illustrative purposes only and only when they are detached from the rest of the strip).

Although this type of granular material to be treated, i.e. the infill, is presented in detail, the plant presented could also be used, with minor detail modifications, in the recycling and disposal of other assemblies of granular material in which there is an overlap of size ranges of granules of different materials, such as, for example, xxxxx the recovery and recycling of riding sands, the drying and selection of silica sands for construction, the processing of inert materials such as kaolin and feldspathic material for the production of ceramic tiles, the selection and separation of spherical and ground quartz for the production of pharmaceutical glass.

The infill, for which the system of the invention is primarily designed, consists of a plurality of different granular materials.

Said plurality of granular materials, schematically illustrated in the figures as polyhedrons, comprises sand, or other inert granular material, having a diameter comprised between 100 μm and 1400 μm, grains of polymer material, generally rubber, having a diameter comprised between 800 μm and 2500 μm and dust (dust can be considered a granular material having a smaller diameter with respect to that of sand, e.g. less than 50 μm). Furthermore, the infill can also comprise small stones, generally having a diameter greater than 3000 μm. The polymeric material, i.e. rubber, could be replaced, in full or in part, by elastic plant fibres such as coconut fibres with the same diameter as the polymeric granular material.

The infill of a worn synthetic turf strip also includes filaments of the turf itself that have detached from the mat during use of the synthetic turf. Such filaments are substantially bodies made of polymer material with an elongated shape, e.g. having a length greater than 10 mm. The polymeric material of the filaments may for example be polypropylene, polyethylene or polypropylene [material types].

Regardless of the exact size values of the different granular materials, at least a portion of the size ranges of the sand granules, polymeric material granules and filaments (i.e. filament granules) of synthetic turf overlap, making it impossible to separate the different materials by screening alone.

As mentioned above, the system 1 may be configured to remove the infill from a synthetic turf, i.e. a synthetic turf mat, in particular that is in a rolled state with the infill present between the synthetic grass filaments.

Figure 2:
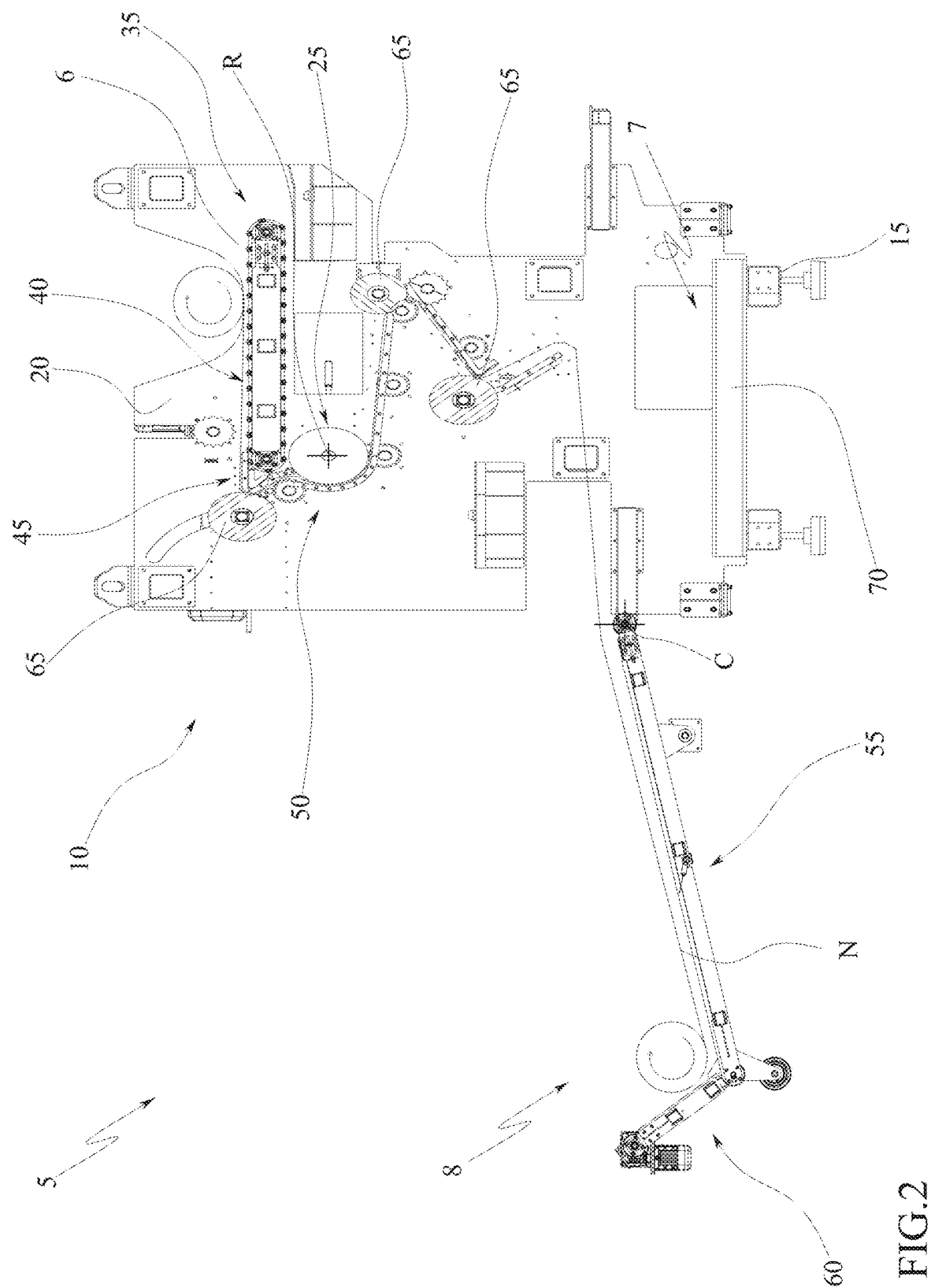
FIG. 2 is a schematic side view of an infill removal machine according to the invention forming part of the system of FIG. 1.
Figure 3:
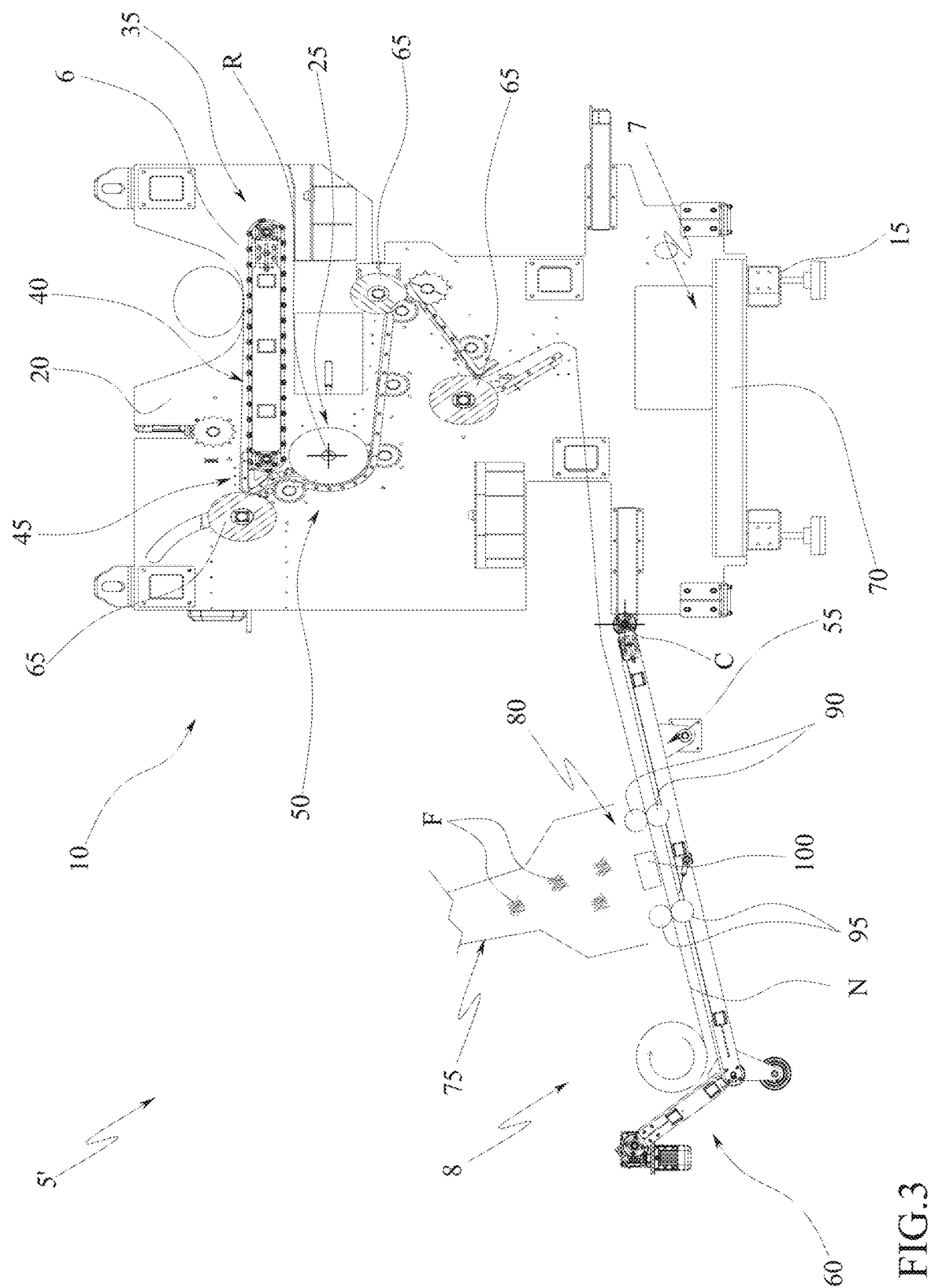
FIG. 3 is a schematic side view of another embodiment of the infill removal machine forming part of the installation of FIG. 1.

To remove infill from synthetic turf, the system includes an infill removal machine 5,5' that mechanically removes infill from the synthetic turf strip, i.e. by means of mechanical operations. This infill removal machine is illustrated in FIGS. 2 and 3.

Alternatively, the system 1 may not comprise the infill removal machine and be configured to process infill already separated from the respective strip of synthetic turf. However, its presence is preferable in order to perform all the operations within the same system.

The infill removal machine 5,5' illustrated in the figures is configured to remove the infill by means of brushing the strip of synthetic turf. However, it is not ruled out that in an alternative embodiment the machine could be configured to brush and beat the strip of synthetic.

The infill removal machine 5,5' is provided with an inlet 6 in which the strip of synthetic turf is positioned, a first outlet 7 from which the infill removed from the strip of turf exits and a second outlet 8 from which the strip of synthetic turf exits after the infill has been cleaned away.

The infill removal machine 5,5' comprises a support frame 10 provided with a support base 15 (possibly connected to support elements on the floor), and for example a pair of lateral walls 20 that rise from said support base 15.

The infill removal machine 5 comprises a brush roller 25.

The machine 5 further comprises a conveyor (or transport) apparatus 35 configured to move the strip of synthetic turf along a predefined path.

In particular, the conveyor apparatus 35 can be configured so that, along at least a portion of the predefined path, the brush roller 25 is wound in contact, at least partially, by the strip of synthetic turf.

The path defined by the conveyor apparatus 35 can be characterised by a plurality of sections, e.g. continuously flanked to one another, along which the strip of synthetic turf is moved.

In particular, at the start and the end of such path, the conveyor apparatus 35 is respectively configured to unroll a roll of synthetic turf and finally to re-roll the strip of synthetic turf to form a roll.

The conveyor apparatus 35 comprises a first section 40 that defines a first transport surface, preferably flat and horizontal, on which the strip of synthetic turf rests stably and on which it is moved.

It is specified that in this discussion, transport surface is used to mean a real or imaginary surface on which the strip of synthetic turf rests at least in part, and is moved.

The roll of strip of synthetic turf N is unrolled at the first section 40.

The conveyor apparatus 35 comprises a second section 45 that describes an elbow curve, e.g. directly connected to the first section 40, i.e. connected continuously thereto.

Said second section 45 is configured like a first inversion section, wherein the strip of synthetic turf performs a curve that subtends an angle greater than 90 degrees, so as to spread out the strip of synthetic turf itself, i.e. so as to spread the blades of synthetic turf that are part of the strip of synthetic turf.

The path can then comprise a third section 50, e.g. continuously connected to the second section 45, at which the strip of synthetic turf is wound, at least partially, around the brush roller 25 of the machine 5,5'.

Said third section 50 is configured so as to keep in contact a portion of the strip of synthetic turf with the brush roller 25, e.g. so as to describe an arch that subtends an angle comprised between 90 degrees and 180 degrees.

Therefore, in the embodiment illustrated, an end portion of the third section 50 distal from the second section 45, is positioned at a lower height with respect to the second section 45.

The end part of the path described by the conveyor apparatus 35 has a pair of contiguous sections forming a V, i.e. a sixth section 55 and a seventh section 60, also connected to one another and to the previous section continuously, onto which it is possible to re-roll the strip of synthetic turf forming a roll to then be moved easily and stored simply.

In particular, the conveyor apparatus 35 comprises a final portion onto which the strip of synthetic turf is rolled after the removal of the infill, which at least partially defines the second outlet 8 of the removal machine itself and which has a first section (sixth section 55) and a second section (seventh section 60) which are contiguous forming a V.

The first section 55 of the final portion, at one end thereof, is rotatably associated with respect to a hinge axis C (e.g. horizontal), idly, to the support frame 10 of the infill removal machine 5 and at the opposite end it is associated with the second section 60 of the final portion.

In the illustrated embodiment, the conveyor apparatus 35 comprises a plurality of conveyors, for example a plurality of conveyor belts and/or sprockets clawing the synthetic turf strip, which define respective sections.

In the embodiment illustrated, the machine 5,5' comprises a plurality of brush rollers 25, each provided with respective bristles, placed along the path defined by the conveyor apparatus 35.

The infill removal machine further comprises a conveyor belt 70 placed at a lower height with respect to the brush roller 25, and aligned vertically thereto, and configured to collect the infill that falls following the removal thereof from the strip of synthetic turf.

Such conveyor belt 70 at least partially defines the first outlet 7 of the infill removal machine.

The machine 5,5' can comprise a washing apparatus (not illustrated) for washing the synthetic turf that uses a washing liquid, e.g. water, for washing the strip of synthetic turf which is transported along the predefined path.

In particular, the washing apparatus is configured to perform the washing of the synthetic turf in a predefined portion of the path downstream of the brush roller 25.

For example, the washing apparatus is provided with a nozzle positioned at the predefined path, configured to direct said washing liquid towards the strip of synthetic turf.

The washing apparatus can also comprise a collection tank (not illustrated) for collecting the washing fluid positioned at a lower height than the nozzles so as to collect the washing liquid that the nozzles direct towards the strip of synthetic turf.

The washing apparatus further comprises a tank (not illustrated) of the washing liquid and a pump (not illustrated) adapted to pressurise the washing liquid and send it to the nozzle.

The washing apparatus can for example be of the closed circuit type and comprise channels adapted to place in fluid communication the washing tank with at least one settling tank, which is in turn in fluid communication with the tank from which the pump draws fluid to be pressurised.

The machine 5,5' can further comprise a drying apparatus provided with a fan (not illustrated) positioned at the predefined path and configured to generate a flow of air towards the strip of synthetic turf so as to dry at least partially the washing liquid present in the strip of synthetic turf. The fan is therefore positioned downstream of the washing apparatus with respect to the strip of synthetic turf along the predefined path.

In the embodiment of the infill removal machine indicated with 5' and illustrated in FIG. 3, in addition to the features of the other embodiment indicated as 5 and illustrated in FIG. 2, there is also a station for removing synthetic grass filaments from the strip of synthetic turf.

This station is positioned after all the infill removal systems (brushing rollers), and for example also the washing and drying apparatus, but before the exit of the strip from the machine, in particular before the end zone of the conveyor apparatus where the synthetic turf strip is rewound. For example, this station is located at section 55. Basically, the machine only removes the synthetic grass filaments after the infill has been removed from the strip of synthetic turf.

The filament removal station comprises a suction unit 75 and a filament removal unit 80 that acts directly on the strip of synthetic turf to remove filaments from the mat so that they can then be suctioned by the suction unit.

The suction unit can be connected to a filter unit 85, which treats the suctioned air containing grass filaments, intercepting them and making them available to be conveyed to a container that contains the suctioned synthetic grass filaments.

The suction unit 75 is equipped with a suction hood positioned at the filament removal unit, e.g. above it, and the suction unit generates enough suction power so that the synthetic grass filaments are suctioned through the hood, e.g. vertically (after their removal). This filament suction power is easily identified by acting on a motor (or motor inverter) of the suction unit adapted to drive a suction fan until the filaments are suctioned through the hood.

The filament removal unit 80 is preferably configured to cut said filaments from the mat. For example, this could be done by means of a rotary blade and/or a hot wire (heated, e.g. by the Joule effect, to such a temperature as to melt the material of which the filaments are composed) which intercepts the strip as it moves through the transport apparatus of the machine. In the drawings, the rotary blade and the hot wire are schematically illustrated with a rectangle indicated with 100.

It cannot be ruled out that in an alternative embodiment not illustrated, the filaments can be removed by tearing them from the mat, e.g. by means of clamp or gripper mechanisms.

To improve the effectiveness of the removal, i.e. the cutting, of the synthetic grass filaments, the filament removal unit 80 comprises a tensioning unit configured to tension the strip of turf in a filament removal, i.e. cutting, area along the transport apparatus of the machine.

In the illustrated embodiment, the tensioning assembly comprises two pairs of rollers, of which a first pair of counter-rotating rollers 90 upstream and a second pair of counter-rotating rollers 95 downstream of the filament removal area with respect to the advancement direction of the strip of synthetic turf along the machine 5' at the location of the filament removal station. Each pair of rollers is arranged with its axis of rotation transverse to the advancement direction of the strip of synthetic turf and clamps a section of the strip of synthetic turf (one roller of the pair is therefore above the strip while the other roller is below it from a plan viewpoint). The first pair of rollers is set to rotate at a lower speed than the second pair of rollers, at least during a tensioning step, and then possibly rotates at the same speed as the other pair of rollers. As a result of this different speed, the second pair of rollers essentially pulls the strip while it is essentially held by the first pair of rollers, thus placing it in tension.

The system may include a buffering store 105 adapted to contain the infill. It may be connected to the first outlet 7 of the machine 5,5', for example by means of an automatic conveyor, preferably in the form of one or more augers 110 or screw conveyors, if this is present in the plant. In one possible embodiment, the buffering store can be configured as a box container with a single infill storage volume inside.

The plant 1 further comprises a screening machine configured to subdivide the infill, i.e. the entire assembly of all granular material exiting the buffering store 100 (or entering the plant in case the infill removal machine and/or the buffering store is not provided) into a plurality of groups of granular material (mixed granular material, i.e. comprising all components of the infill) having different size ranges. For example, the screening machine divides the infill into three groups of granular material, of which the first group is granular material, the second group is granular material and the third group is granular material.

Granular bodies of a size (nominal diameter) falling within a first predetermined size range belong to the first group of granular material. Granular bodies falling within a second predetermined size range, which second size range is distinct and immediately adjacent to the first predetermined size range and has only smaller values than the smallest value of the first predetermined size range belong to the second group of granular material. Granular bodies falling within a third predetermined size range, which third size range is distinct and immediately adjacent to the second predetermined size range and has only smaller values than the smallest value of the second predetermined size range belong to the third group of granular material. All such groups of granular material comprise both sand and small stones as well as polymeric material granules and (granules of) synthetic grass filaments. It is further specified that the three size ranges of the groups of granular material exiting the infill are distinct from each other (with no size overlap between them). Furthermore, it is not excluded that in an alternative embodiment not illustrated and less preferred, the screening machine may divide the infill into only two groups of granular materials of different sizes.

The screening machine is preferably also configured to dry the infill, i.e. all of the granular material leaving the buffering store, for example by means of a flow of hot air, while the infill is being screened.

It is not excluded that in an alternative, less compact and therefore less preferred embodiment, drying is carried out in a separate drying machine located upstream of the screening machine with respect to the direction of flow of the infill in the system.

Figure 4:
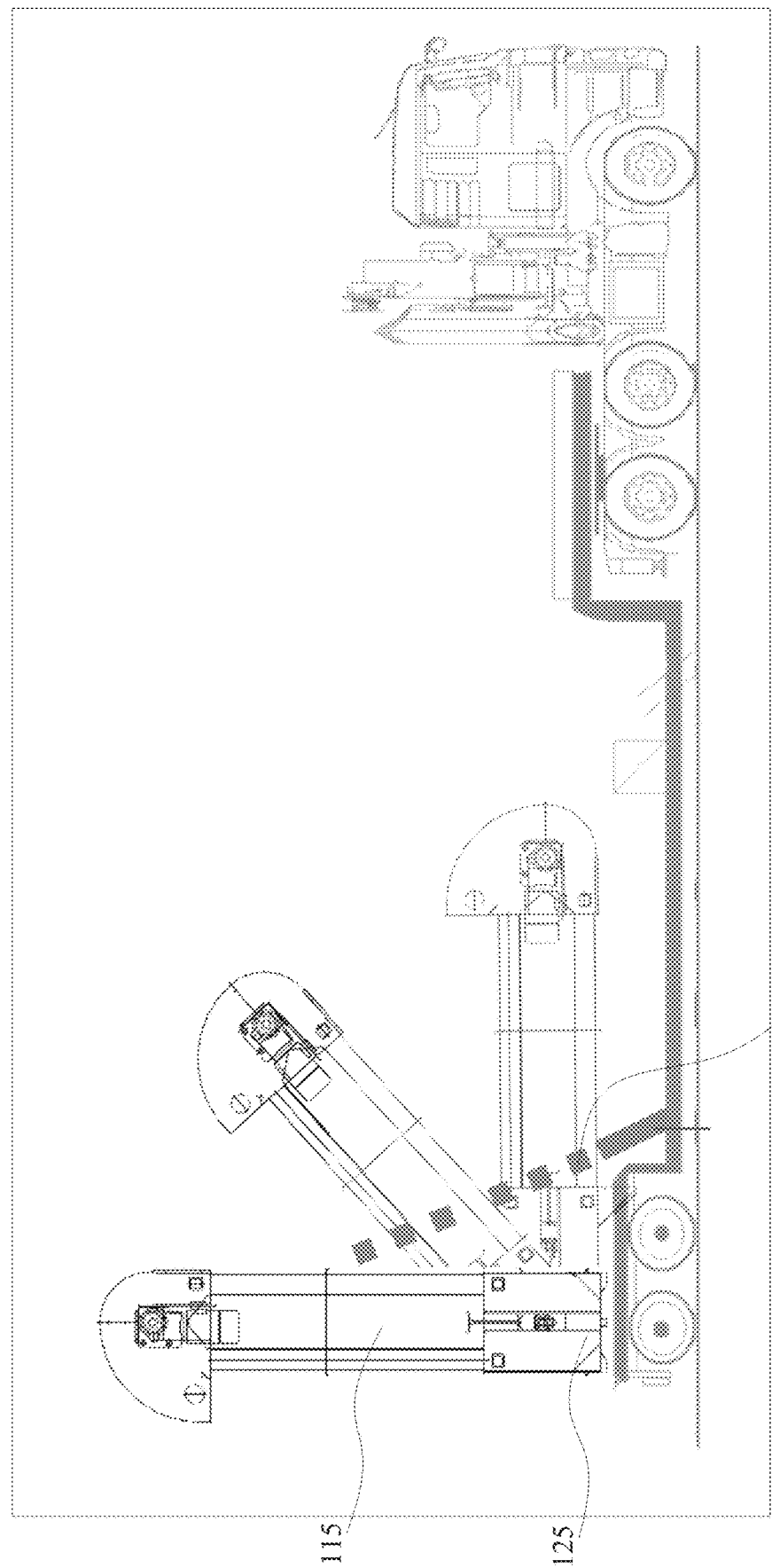
FIG. 4 is a schematic side view of a bucket lift of the plant of FIG. 1.

The buffering store 100 is connected, for example directly, to the screening machine by means of an automated conveyor, for example in the form of a bucket lift 115, illustrated in FIG. 4. Preferably, such a bucket lift is movable by means of linear hydraulic actuators 120 relative to a movable structure, e.g. in the sense of a platform that can be transported by a truck, between a non-use position, in which the lift is essentially horizontal lying on the movable platform, and an active position, in which the lift rises vertically from the movable platform (both positions are schematically illustrated in FIG. 4).

In the configuration illustrated in the figure, a lower longitudinal end 125 of the bucket conveyor is hinged with respect to a hinge axis to the mobile platform and jacks act on a portion of the bucket conveyor (e.g., distal from the lower longitudinal end) so as to rotate the bucket conveyor between the inactive position and the active position about the hinge axis.

Figure 5:
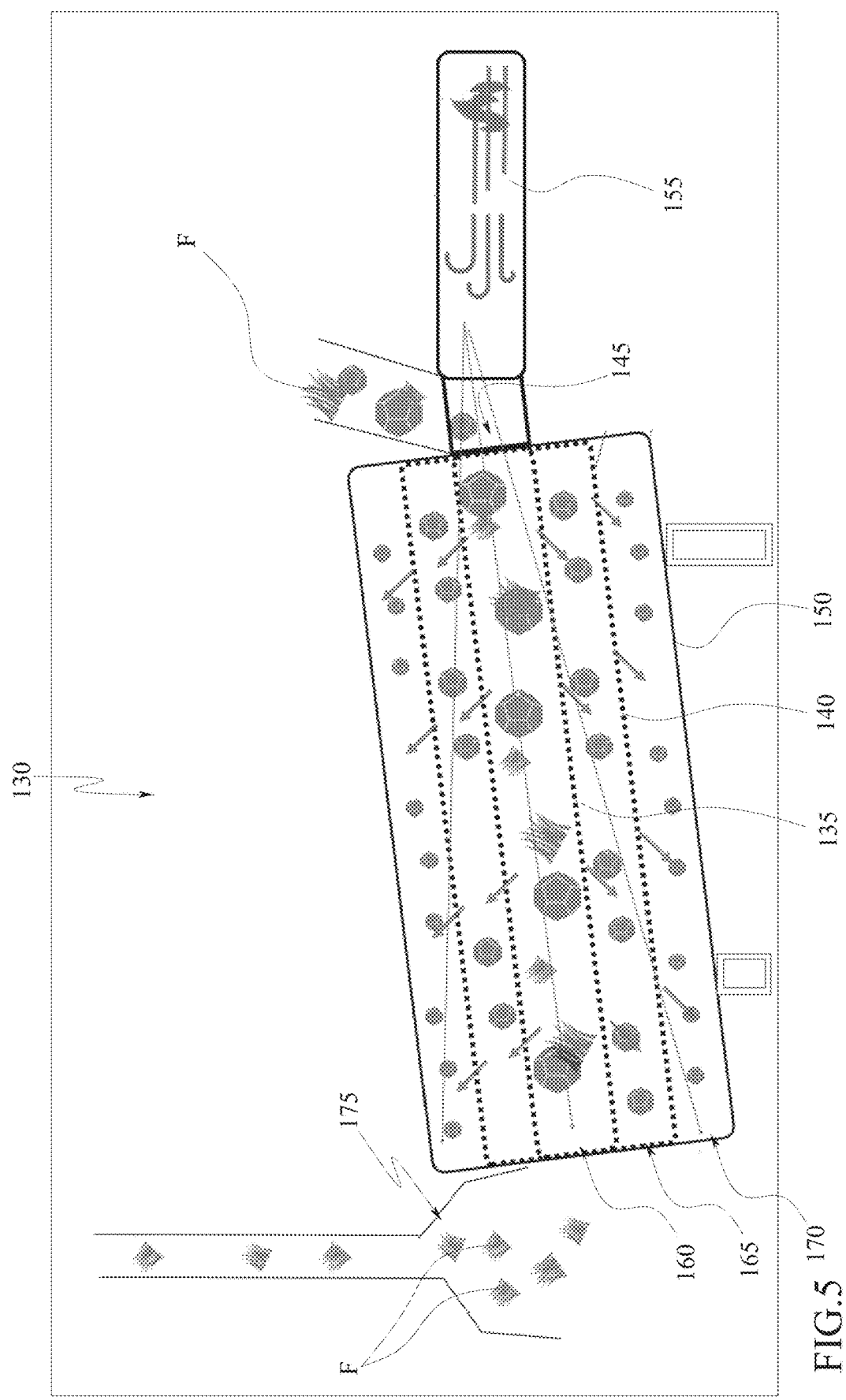
FIG. 5 is a schematic side view of a screen drying machine of the plant of FIG. 1.
Figure 6:
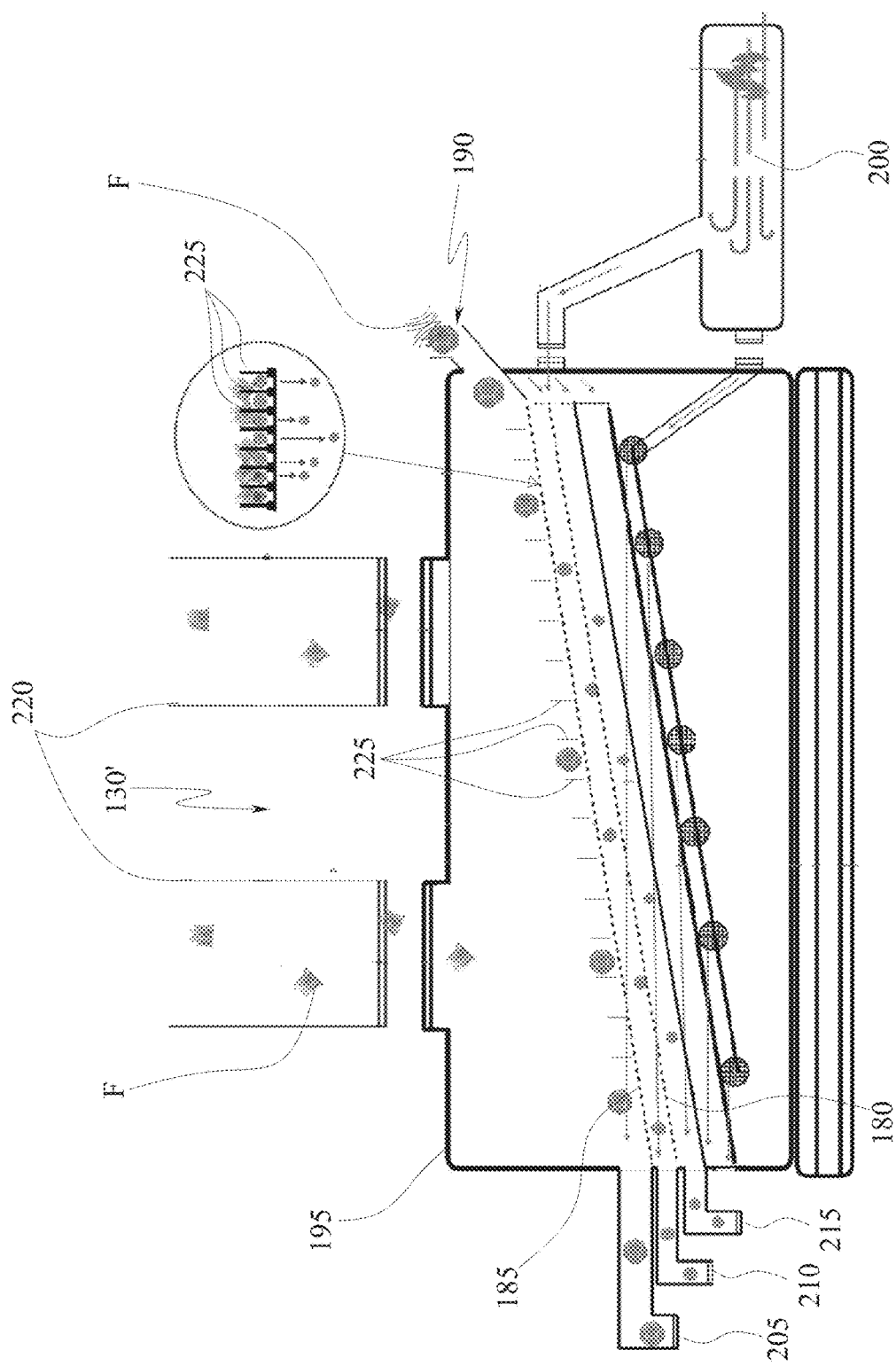
FIG. 6 is a schematic side view of another embodiment of a drying and screening machine of the plant of FIG. 1.

In the drawings, FIGS. 5 and 6, two different embodiments 130 and 130' of a screening machine are illustrated, both performing the preferred drying of the infill during the screening itself. Both embodiments comprise one or more screens, which are to be understood as bodies equipped with calibrated holes through which only covers with a diameter smaller than that of the calibrated hole can pass, allowing the incoming infill to be divided into the different groups of granular material (mixed). In particular, the screening machines have an inlet mouth through which the infill material enters and a number of separate outlet mouths through which different groups of granular material pass.

In the embodiment of FIG. 5, a rotary drum screening machine 130 is illustrated, hereafter abbreviated as screening machine 130.

Said screening machine 130 is provided with at least one rotating tubular screen, i.e., a mesh body, or in any case provided with a plurality of calibrated holes of the same size, wound around an axis to form a tubular structure which is rotated about said axis. Preferably, there are a plurality of such rotating tubular screens, i.e., tubular bodies concentric to each other, of which the innermost body has calibrated holes or the holes of the mesh of the largest size, and in which the size of the holes is gradually decreasing in a constant manner from the inner tubular body towards the outer tubular bodies. In the illustrated embodiment there are two perforated tubular bodies, of which one inner tubular body 135 has holes of sizes, i.e. of a size, larger than the holes of outer tubular body 140 coaxial to and containing inner tubular body 135.

Regardless of the number of tubular bodies, they are all rotated about the axis to which they are coaxial, e.g. at the same rotational speed. The axis may be horizontal, or inclined as in the illustrated embodiment so as to promote the flow of the granular material by gravity from an inlet mouth 145 of the granular material (e.g. where the bucket lift unloads the material) to an outlet mouth, i.e. a plurality of outlets of the groups of screened granular material. The inlet mouth 145 is at a higher vertical height than the outlet mouth 160.

In detail, the screening machine 130 comprises a closed box body 150 inside which the tubular screen, i.e. the tubular bodies 135,140, are entirely housed.

The box body 150 defines the inlet mouth through which the infill is inserted and which is in direct communication with the inside of the tubular body, i.e. with the inside of the inner tubular body 135. The inlet mouth is also in direct fluid communication with a generator of a hot air flow 155 configured to blow hot air into the box body, for example comprising a burner having a fan (not shown) to push hot air towards the inlet mouth 145. This flow is directed substantially parallel to the axis of the tubular body. For example, the hot air flow generator is configured so that the average temperature inside the box body is comprised between 90° C. and 150° C.

The box body 150 comprises the outlet mouth 160, i.e. a first outlet mouth 160 in communication with the inner volume of the tubular body, i.e. the inner tubular body. The first outlet mouth 160 is crossed by the material that does not pass through the calibrated holes of the tubular screen, i.e. the calibrated holes of the inner tubular body 135, which corresponds to the first group of granular material.

This first outlet mouth 160 is also connected (directly) to a suction unit 175 configured to suction dust and synthetic grass filaments. Therefore, in this embodiment, dust and part of the synthetic grass filaments also pass through the first outlet mouth. In particular, the blowing power of the hot air flow generator 155 and the suction power of the suction unit 175 are configured (i.e. adjusted) in such a way that at least part of the dust and synthetic grass filaments contained in the infill entering the screening machine do not pass through the calibrated holes in the tubular screen, i.e., the calibrated holes of the inner tubular body 135, but remain raised as they pass through the tubular screen (the inner volume of the tubular screen) by the flow of hot air and are suctioned by the suction unit when they reach the vicinity of the first outlet mouth 165. These blowing and suction powers are calibrated manually, e.g. by adjusting the motors that drive the fans of the respective systems, by observing the materials suctioned until only the dust and part of the synthetic grass filaments are between them, as heavier materials must instead pass through the calibrated holes of the tubular screen, or run over it if they cannot pass through it, and therefore must not be suctioned.

The suction unit 175 can be connected to a filter unit, which treats the suctioned air containing grass filaments, intercepting them and making them available to be conveyed to a container that contains the suctioned synthetic grass filaments. For example, the filter unit is always the filter unit 85.

The box body further comprises a second outlet mouth 165, in communication with an annular volume interposed between the inner tubular body 135 and the outer tubular body 140, from which the granular material that has passed through the calibrated holes of the inner tubular body (and not the outer tubular body, i.e. its calibrated holes), which corresponds to the second group of granular material, exits. The box body also includes a third outlet mouth 170 in communication with an annular volume interposed between the outer tubular body and the box body, from which the granular material that has passed through the outer tubular body, which corresponds to the third group of granular material, exits.

FIG. 6 shows a different embodiment of a screening machine, indicated by 130', which is equipped with at least one flat screen inclined with respect to a horizontal plane (and also with respect to a vertical plane). Preferably there is a plurality of flat screens, for example two, vertically aligned and both inclined with respect to a horizontal plane (and also with respect to a vertical plane). In the embodiment shown, there is a lower flat screen 180 and an upper flat screen 185 superimposed on the lower flat screen 180 in the plan view.

Each flat screen is shaped like a flat mesh body or fitted with a plurality of calibrated holes of the same size. The upper screen 185 has passage holes of a larger size, i.e. one size larger than the passage holes of the lower screen 180.

The inclination of the screens is such as to promote the flow of granular material by gravity from an inlet mouth 190 of granular material (for example where the bucket lift unloads the material) to an outlet mouth, that is, a plurality of outlet mouths, of the groups of screened granular material, located at a lower vertical height than the vertical height of the inlet mouth 190. It cannot be ruled out that in an alternative embodiment not illustrated, devices configured to vibrate the inclined flat screen, i.e. inclined flat screens, may also be present to promote the flow of granular material.

The screening machine 130' comprises a closed box body 195 inside which the inclined flat screen, i.e. inclined flat screens, are entirely housed. The box body 195 defines the inlet mouth 190 through which the infill is inserted and which is in direct communication with a volume located between the box body and an upper surface of the inclined flat screen, i.e. the upper inclined flat screen. The inlet mouth 190 is also in direct fluid communication with a generator of a hot air flow 200 configured to blow hot air into the box body, for example comprising a burner having a fan (not shown) to push hot air towards the inlet mouth 190. This flow is directed substantially parallel to a lying plane of the inclined flat screen and/or horizontally. For example, the hot air flow generator is configured so that the average temperature inside the box body is comprised between 90° C. and 150° C.

The box body 195 comprises the outlet mouth, i.e., a first outlet mouth 205, in communication with the inner volume of the box body 195 located above the inclined flat screen, i.e., the upper inclined flat screen 185. In other words, the first outlet mouth is crossed by the material that does not pass through the inclined flat screen, i.e. the upper flat screen 185, which corresponds to the first group of granular material. In practice, the granular material that does not pass through the calibrated holes of the inclined flat screen 180, i.e. the upper flat screen 185, flows over the inclined flat screen (by gravity) and then exits through the outlet mouth, i.e. the first outlet mouth 205.

The box body further comprises a second outlet mouth 210, in communication with a volume interposed between the inclined flat screen and the box body, i.e. between the upper inclined flat screen 185 and the lower inclined flat screen 180.

The granular material that has passed through the calibrated holes of the inclined flat screen, i.e. the calibrated holes of the upper inclined flat screen 185, (and not the calibrated holes of the lower inclined flat screen 180, running on the lower inclined flat screen 180) exits from the second outlet mouth 210. The material leaving the second outlet mouth corresponds to the second group of granular material. The box body also comprises a third outlet mouth 215 in communication with a volume interposed between the lower inclined flat screen 180 and the box body 195, from which the granular material that has passed through the calibrated holes of the lower inclined flat screen 180, which corresponds to the third group of granular material, exits.

The volume above the inclined flat screen, i.e. above the upper inclined flat screen 185, is in direct fluid communication with a suction unit 220 configured to suck up dust and synthetic grass filaments. In particular, the blowing power of the hot air flow generator 200 and the suction power of the suction unit 220 are configured (i.e. adjusted) in such a way that at least part of the dust and synthetic grass filaments contained in the infill entering the screening machine do not pass through the inclined flat screen, or the upper inclined flat screen, but are lifted from them and suctioned by the silent effect generated by the hot air flow and the suction unit 220. These blowing and suction powers are calibrated manually, e.g. by adjusting the motors that drive the fans of the respective systems, by observing the materials suctioned until only the dust and part of the synthetic grass filaments are between them, as heavier materials must instead pass through the inclined flat screen or run over it, and therefore must not be suctioned.

The suction unit 220 can be connected to a filter unit, which treats the suctioned air containing grass filaments, intercepting them and making them available to be conveyed to a container that contains the suctioned synthetic grass filaments. For example, the filter unit is always the filter unit 85.

The screening machine 130' may also comprise a plurality of rods 225 rising vertically and superiorly from the inclined flat screen, i.e. the upper inclined flat screen. Such rods 225 may be grouped into groups of rods aligned along a direction transverse (perpendicular) to the advancement direction of the infill running along the inclined flat screen, i.e., along the upper inclined flat screen, to form essentially a comb, i.e., a plurality of combs arranged transversely to said advancement direction and parallel to each other arranged at a non-zero distance from each other (see in FIG. 6 the enlargement in the circle showing the rods, i.e., a comb, and the upper inclined flat screen from a viewpoint along the advancement direction, downstream of the rods with respect to the advancement direction). The advancement direction essentially corresponds to the longitudinal axis of the inclined flat screen, which is therefore inclined in the same way as the inclined flat screen.

For example, the rods 225 of each comb are spaced along a horizontal axis so as to form a gap between them with a minimum width comprised between 40 mm and 60 mm.

Irrespective of their grouping into combs, the rods are positioned at least at the suction hoods of suction unit 220, i.e. they are aligned vertically with them. This makes it easier to suction filaments that have been blocked by the rods.

In order to improve the filament retaining capacity exerted by the rods 225, the rods are made of an electrically insulating material, e.g. polymer, and are connected (each) to a positive pole and a negative pole of an electrical power source (not shown) (at spaced portions of the rod itself). The rods 225 may be electrically connected individually, or each comb may be a body of a single electrically insulating material, e.g. a polymeric material, connected to a respective positive pole and a respective negative pole of the electrical power source (such connections being made in spaced portions of the comb). This generates an electrostatic charge on the comb that acts like a magnet for the turf filaments which, being made of polymeric material, tend to be attracted by the electrostatic charge and stop more easily against the rods.

In the case where the said rods are connected to the electrical power source, the system can be configured to increase the suction force of the suction unit 220 after a predetermined time interval from the insertion of all the infill into the screening machine, in order to suction the filaments blocked by the rods more effectively.

Figure 8:
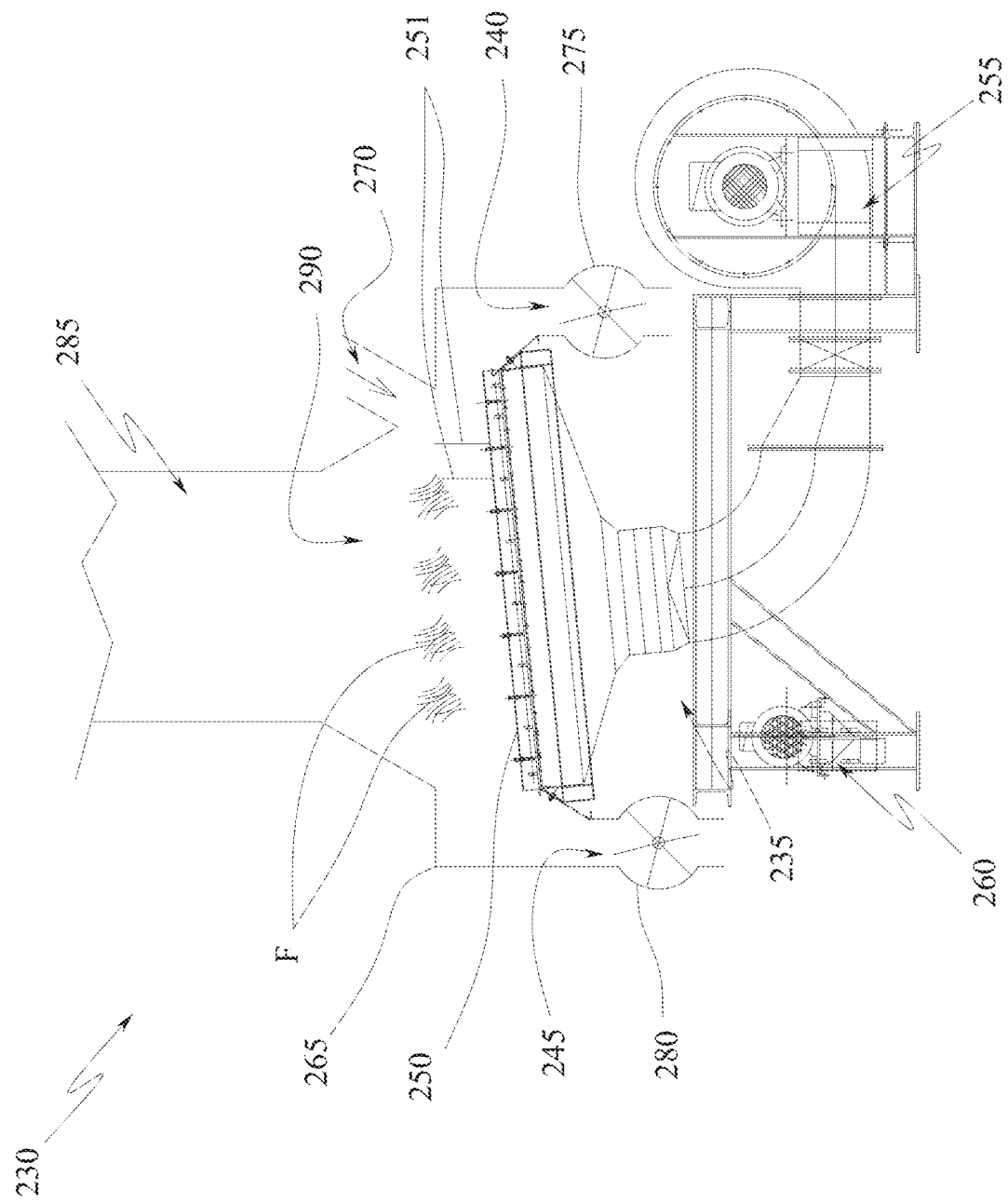
FIG. 8 is a schematic side view of a densimetric separating machine of the plant of FIG. 1.

The plant 1 comprises a densimetric separating machine 230, see FIG. 8, placed downstream (with respect to the movement direction of the material along the plant) of the outlet mouth of the screening machine, i.e. there is a densimetric separating machine 230 for each mouth of the screening machine, in particular for each group of granular material exiting the screening machine 130,130' (except for the suctioned material). The densimetric separating machine, i.e. each densimetric separating machine, is configured to divide a group of granular (mixed) material into two subgroups of granular material (each belonging to a respective type of material and with dimensions belonging to the size range of the group of material) on the basis of the difference in density. In particular, the two subgroups are sand and polymeric granular material (alone or mixed or replaced by fibres of plant material).

The densimetric separating machine, i.e. each densimetric separating machine, comprises a vibrating densimetric table 235, i.e. a gravimetric separator.

The vibrating densimetric table 235 is provided with a first outlet 240 and a second outlet 245 and is configured to convey towards the first outlet 240 the granular material having a density greater than a predefined threshold value and towards the second outlet 245 the granular material having a density less than the predefined threshold value.

In this case the sand exits from the second outlet and the polymer material (or the elastic plant fibres, e.g. coconut) exits from the first outlet, as the sand has a density of about 1500 kg/m^3 and the polymer material (or the elastic plant fibres, e.g. coconut) has a density of about 650 kg/m^3.

The second outlet is placed at a higher height with respect to the first outlet.

The vibrating densimetric table 235 comprises a flat plate 250 inclined with respect to a horizontal plane and provided with through openings from which a flow of gas exits, in the upwards direction, placed in pressure by a pumping unit 255 of the densimetric table itself fluidly connected to said flat plate 250.

The flat plate 250 is preferably inclined with respect to a horizontal plane by an angular value comprised between 9° and 13° and the through holes have a diameter comprised between 200 μm and 400 μm.

The vibrating densimetric table 235 also comprises a vibrating unit 260 configured to place the flat plate 250 in vibration.

In the preferred embodiment illustrated, the densimetric separating machine 230, i.e. each densimetric separating machine 230, is configured to divide a group of granular (mixed) material into three subgroups of granular material (each belonging to a respective type of material and with dimensions belonging to the size range of the group of material) on the basis of the difference in density. In particular, the three subgroups are sand, polymeric granular material (alone or mixed with or replaced by plant material fibres) and synthetic grass filaments (i.e. granules of it).

The densimetric separating machine 230, i.e., each densimetric separating machine 230, comprises a box casing 265 which encloses the flat plate 250 inside it and is provided with a supply mouth 270 into which the predetermined group of granular material (between the first, second and third) is poured.

The box casing 265 then has a first opening and a second opening which make available the first outlet 240 and the second outlet 245, which are occluded respectively by a first rotary valve 275 and a second rotary valve 280 of the densimetric separating machine itself. The densimetric separating machine also includes a suction unit 285 configured to suction air into the box casing 265 and provided with a suction mouth 290 placed vertically above the flat plate (superimposed in plan to a portion thereof, for example at least half of its surface).

The suction unit 285 is configured to create (also by means of the presence of the rotary valves at the outlets) a depression inside the box body, i.e. inside the box body the suction unit maintains a lower pressure than outside the box body.

This depression is, for example, 2 millibars below the pressure outside the box casing. The suction unit is variable power, and can be set to at least a first predetermined suction power and a second predetermined suction power greater than the first. The suction unit is configured to suction the last synthetic grass filaments in the granular material and is connected to a filter to intercept said filaments. The suction unit 285 can be connected to a filter unit, which treats the suctioned air containing grass filaments, intercepting them and making them available to be conveyed to a container that contains the suctioned synthetic grass filaments. For example, the filter unit is always the filter unit 85.

The suction mouth 290, the supply mouth 270 and the rotary valves 275 and 280 define the only passages in the box housing that allow communication between the external environment and the environment inside the box housing between the box housing itself and the flat table 250.

It should be noted that a rotary valve, also called a star valve, means a box body provided with an inlet opening, which in the present case is directly attached to a respective outlet between the first outlet and the second outlet, an outlet opening placed on an opposite side of the box body with respect to the inlet opening (in the present case facing downwards), and an internal volume in communication with said openings and occupied by a rotor rotatably associated with the box body with respect to an axis of rotation and provided with a plurality of paddles contacting an internal surface of the box body, defining the internal volume, separating the input opening from the output opening at any time during the rotation of the rotor. In particular, there are at least four paddles, angularly equidistant with respect to an axis of rotation of the rotor and forming a plurality of closed chambers (equal in number to the number of paddles) each defined between two adjacent paddles and the internal surface defining the internal volume. During the rotation of the rotor, two chambers diametrically opposed to the axis of rotation of said plurality of chambers come into communication with the inlet opening and the outlet opening of the rotary valve itself, without being connected to each other.

All the first outlets, i.e. the first rotary valves, of the separating machines are in communication by conveyors to one or more containers suitable for containing the granular polymeric material (and/or fibres of plant material), and all the second outlets, i.e. the second rotary valves, of the separating machines are in communication by conveyors to one or more containers suitable for containing the sand.

In the illustrated embodiment, a conveyor, 295 and 300 respectively, e.g. a belt conveyor or a screw conveyor, is in communication with the respective first or second outlets and a corresponding bucket conveyor is used to load the granular material into the respective container.

The groups of granular material exiting the screening machine are transported to the respective densimetric separating machine 230 by means of a respective conveyor located downstream of the corresponding outlet mouth. Such a conveyor can for example be a bucket conveyor as described above.

Each densimetric separating machine 230 has a plurality of rods 251 rising vertically and superiorly from the flat plate 250.

Said rods 251 may be grouped into groups of rods aligned along a transverse direction (perpendicular) to a longitudinal axis of the flat plate extending from the outlet 245 to the outlet 240, to form substantially a comb, i.e. a plurality of combs arranged transversely to said longitudinal axis. This longitudinal axis corresponds substantially to the direction of flow along the flat plate of the two divided groups of granular material, one moving towards the outlet 245 and one moving towards the outlet 240.

Preferably the rods are positioned in one half of the flat plate closer to the outlet 240 than to the outlet 245.

For example, the rods 251 of each comb are spaced along a horizontal axis so as to form a gap between them with a minimum width comprised between 40 mm and 60 mm. This minimum width varies depending on whether it is the separating machine for the first group of granular material or the separating machine for the second group of granular material or the separating machine for the third group of granular material.

Regardless of their grouping in combs, the rods 315 are positioned at least at a suction hood 290 of the suction unit 285, i.e., they are vertically aligned and placed below said suction hood of the suction unit. This makes it easier to suction filaments that have been blocked by the rods.

In order to improve the filament retaining capacity exerted by the rods 251, the rods are made of an electrically insulating material, e.g. polymer, and are connected (each) to a positive pole and a negative pole of an electrical power source (not shown), as in the case of the rods 225 of the screening machine.

In the case where the said rods are connected to the electrical power source, the system can be configured to increase the suction force of the suction unit 285 after a predetermined time interval from the insertion of all the granular material of the corresponding group of granular material, in order to suction the filaments blocked by the rods more effectively.

Between each respective outlet mouth of the screening machine 130,130' and the respective densimetric separating machine 230, e.g. downstream of the aforementioned conveyor, there is a corresponding separating machine 305 adapted to separate synthetic grass filaments (or at least a portion thereof) from the rest of the respective granular material of the group of granular material.

Such a separating machine comprises a chute provided with a plurality of bars 310 parallel to each other and spaced apart by a predetermined amount, such as to allow the material of the group of granular material to fall into a gap present between the bars.

Each separating machine also comprises a plurality of rods 315 that rise vertically and above the bars of the chute.

Such rods 315 may be grouped in groups of rods aligned along a transverse direction (perpendicular) to a longitudinal axis of the chute, essentially forming a comb, i.e. a plurality of combs arranged transversely to said longitudinal axis.

Figure 7:
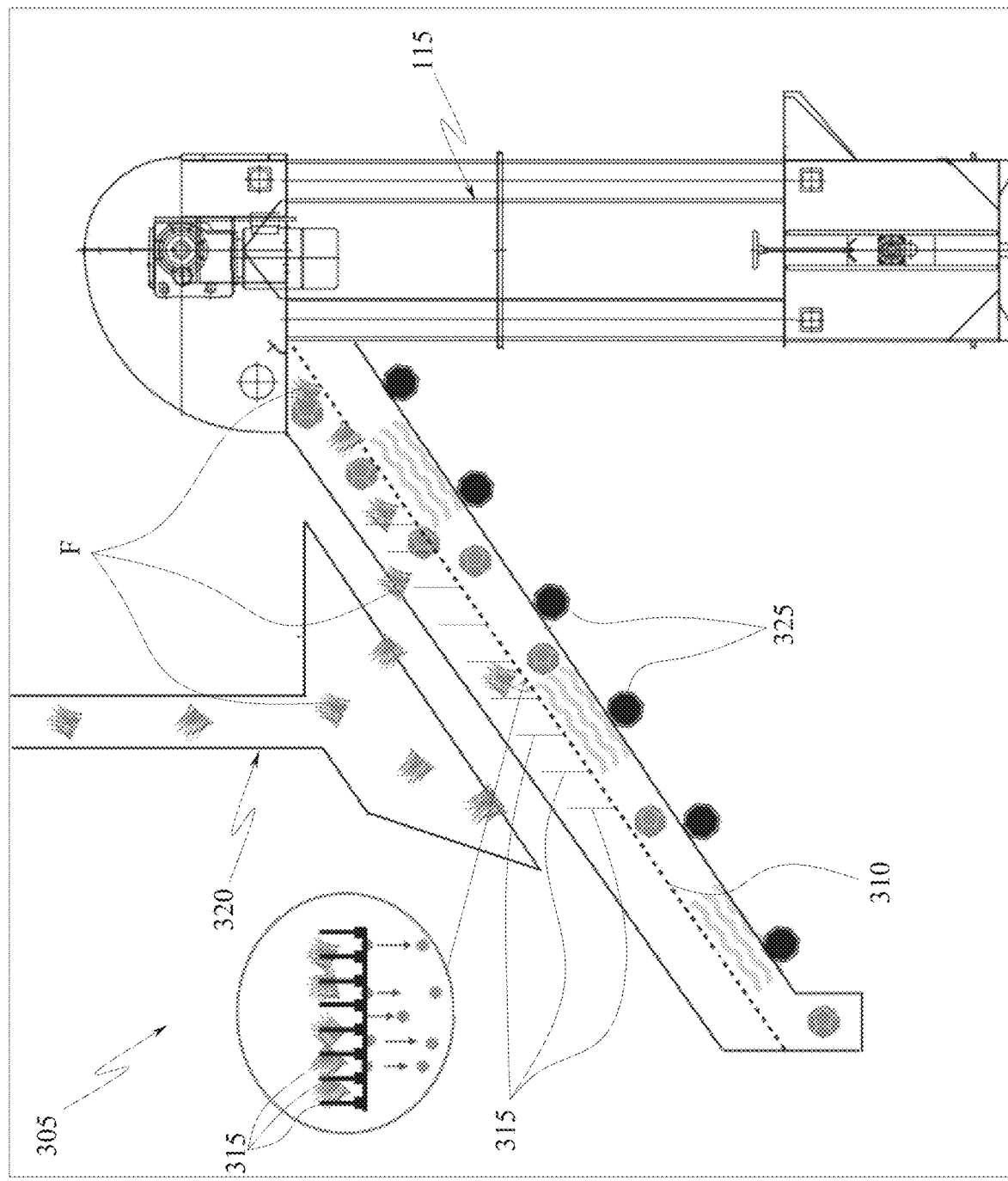
FIG. 7 is a schematic side view of a separating machine of the plant of FIG. 1.

This longitudinal axis essentially corresponds to the direction of flow along the chute of a granular material that is larger than the gap between the bars and therefore cannot fall by gravity between them. See in FIG. 7 the enlargement in the circle showing the rods, i.e. a comb, and the rods from a viewpoint along the direction of flow, downstream of the rods shown in relation to the direction of flow.

For example, the rods 315 of each comb are spaced along a horizontal axis so as to form a gap between them with a minimum width comprised between 40 mm and 60 mm. This minimum width varies depending on whether it is the separating machine for the first group of granular material or the separating machine for the second group of granular material or the separating machine for the third group of granular material.

Regardless of their grouping in combs, the rods 315 are positioned at least at a suction hood of a suction unit 320, i.e., they are vertically aligned and placed below said suction hood of the suction unit. This makes it easier to suction filaments that have been blocked by the rods. The suction unit 320 can be connected to a filter unit, which treats the suctioned air containing grass filaments, intercepting them and making them available to be conveyed to a container that contains the suctioned synthetic grass filaments. For example, the filter unit is always the filter unit 85.

In order to improve the filament retaining capacity exerted by the rods 315, the rods are made of an electrically insulating material, e.g. polymer, and are connected (each) to a positive pole and a negative pole of an electrical power source (not shown), as in the case of the rods 225 of the screening machine.

In the case where the said rods are connected to the electrical power source, the system can be configured to increase the suction force of the suction unit 320 after a predetermined time interval from the insertion of all the granular material of the corresponding group of granular material, in order to suction the filaments blocked by the rods more effectively.

The separating machine, i.e. each separating machine, may also comprise a vibrating unit 325 connected to the chute and configured to put it into vibration.

The plant 1 illustrated is a mobile plant, i.e. (all) the plant components are mounted on transportable platforms, e.g. from a truck. Each platform comprises a plurality of hollow seats, e.g. made in a lower portion of the platform itself, to allow the fixing of the platform to the carriage of a vehicle.

The invention also makes available a method for recycling the infill of a synthetic turf using, for example, the above-described plant 1, and also a method for recycling a roll of synthetic turf strip N and its infill where a station for removing synthetic grass filaments from the mat of the strip is present in the plant, such as in the infill removal machine 5'.

In particular, the method for recycling a roll of synthetic turf strip N and the infill contained within it includes the following steps:
  unrolling the strip of synthetic turf, e.g. using the transport apparatus of the infill removal machine 5',
  mechanically removing the infill from the synthetic turf strip, e.g. using the brush rollers 25 of the infill removal machine 5',
  collecting the removed infill, for example by means of the conveyor 70 leading to the first outlet 7 of said removed infill,
  removing filaments F of synthetic turf from the mat of the strip N, e.g. by means of the filament removal station 75,80 of the infill removal machine 5',
  re-rolling the strip of synthetic turf, e.g. by means of the end section 55,60 of the transport apparatus of the infill removal machine 5',
  drying the removed infill, i.e., the entire assembly of removed granular material, by means of a flow of hot air, and screening the infill through a plurality of successive screens each having calibrated holes of different sizes, subdividing the infill into a plurality of groups of granular material having different size ranges, e.g., such steps are both performed simultaneously by the screening machine 130 or 130',
  separating each group of granular material into two subgroups (preferably into three subgroups) based on the difference in density of the materials, e.g. using densimetric separating machines 230,
  conveying separate subgroups of granular materials to different collection containers, e.g. by means of plant conveyors that move granular material to the collection containers.

The step of removing the synthetic grass filaments from the mat comprises the step of stretching or tensioning a portion of the strip, at which the removal takes place, while the removal takes place, for example by means of the two pairs 90,95 of counter-rotating rollers.

During the removal of the synthetic grass filaments, it is also provided to carry out the simultaneous suctioning of the removed synthetic grass filaments. In particular, while the filament removal unit 100, for example the hot wire or rotary blades, act on the filaments, the suction unit 75 of the removal station is actuated by immediately suctioning the filaments that are removed from the mat.

In further detail, the removal of synthetic grass filaments may involve the steps of stretching a portion of the strip of synthetic turf, i.e. its mat, by activating the suction unit and then operating the removal unit 100, e.g. by rotating the rotating blades or applying an electric current to the hot wire so as to generate heat through the Joule effect.

Regardless of whether the removal of the filaments from the strip of synthetic turf is carried out, the invention makes available said method for recycling the infill of a synthetic turf, said infill being formed by a plurality of different granular materials, including at least sand granules, polymeric material granules and synthetic grass filaments.

The aforesaid method comprises the following steps:
  drying the infill, i.e., the entire assembly of granular material (in other words all of the infill), by means of a flow of hot air, and screening the infill through a plurality of successive screens each having calibrated holes of different sizes, subdividing the infill into a plurality of groups (for example three) of (mixed) granular material having different size ranges, e.g., such steps are both performed simultaneously and in particular by the screening machine 130 or 130',
  separating each group of granular material into two subgroups of granular material (belonging to a single material type) based on the difference in density of the materials, e.g. using densimetric separating machines 230,
  conveying separate subgroups of granular materials to different collection containers, e.g. by means of various plant conveyors that move granular material to the collection containers.

The method therefore differs from the previous one simply in that it does not comprise the step of unrolling, removing the infill, removing the filaments and re-rolling.

During the steps of drying and screening the infill, i.e. all of the infill, it is also provided to suction at least a portion of the synthetic grass filaments present in the infill. For example, this step is carried out by the suction units 175 and 220, respectively of the machine 130 and 130'.

Further, where the infill screening machine 130' for dividing the infill into mixed granular material groups comprises rods 225, the method may further comprise operating the suction unit 220 at a predetermined suction power while the infill is being screened and dried and increasing the suction power to a second predetermined suction power, greater than the first suction power, when all of the incoming infill, with the exception of the synthetic grass filaments retained by the rods, has passed through the outlets of the infill removal machine.

The method may further comprise, following the step of screening into groups of granular material of different size ranges and prior to the step of separating each group of granular material into two subgroups of granular material based on the difference in density of the materials, the step of conveying at least one group of screened granular material into the separating machine 305, or the step of conveying each group of screened granular material into a respective separating machine 305.

Figure 9:
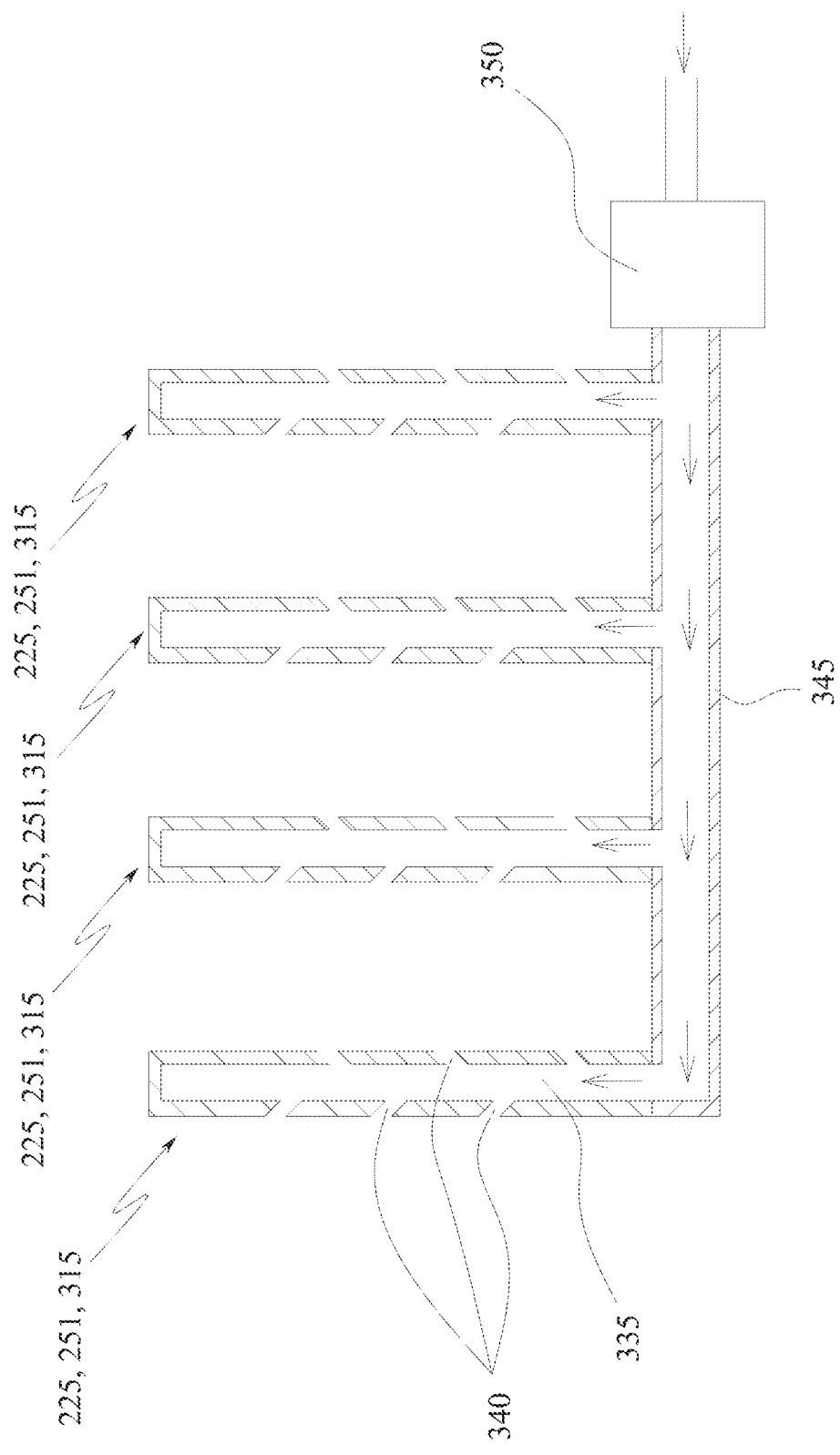
FIG. 9 is a schematic view of a rod assembly according to the invention.

At least one plurality of rods between 225, 251 and 315 is of the type illustrated in FIG. 9. In particular, in addition to the features described above for these rods, each of these rods can be crossed by a plurality of holes that act as nozzles for pressurised air blowers that improve the uncoupling of the retained synthetic grass filaments so that they can be suctioned by the respective suction units.

In the illustrated embodiment, each rod includes an internal (longitudinal) cavity 335 that is in fluid communication with the environment outside the rod via a hole 340, for example a plurality of holes 340, which essentially behaves like a nozzle.

Preferably, this hole, or these holes, has a central axis transverse to a longitudinal axis of the rod and faces upwards. Where the rods are arranged in a comb, each comb comprises a common duct 345 placing in communication the internal cavities 335 of the different comb rods.

Whether there is a comb or whether the rods are independent of each other, there is a solenoid valve 350, one for each rod or one for each common duct, interposed between the internal cavity, i.e. the common duct, and a source of pressurised gas (e.g. compressed air).

The solenoid valve is connected to an electronic control and command unit (not illustrated), which is configured to cyclically open the valve so that pressurised gas from the pressurised gas source can reach the internal cavities 335 and from there exit through the holes 340. In particular, the solenoid valve 350 is controlled by the electronic control and command unit to cyclically open for a first predetermined time interval and subsequently to close for a second, consecutive, predetermined time interval. The second predetermined time interval can be expected to be greater than the first predetermined time interval.

It can also be provided to increase the suction power of the respective suction unit at least at the first predetermined time interval.

The operation of the system 1 is as follows.

In the case of the infill removal machine 5 or 5', the roll of synthetic turf strip is unrolled (using the transport apparatus of the machine 5,5') and after being unrolled is conveyed (again using the transport apparatus of the machine) to the brush rollers which remove the infill between the synthetic grass filaments. The extracted infill is conveyed to the first outlet of the screening machine and in particular to the buffering store. The strip of synthetic turf is then rolled up again and taken to a second outlet of the screening machine, where it can be picked up, e.g. by a forklift or crane. In the case of the screening machine 5', the strip of synthetic turf, deprived of the infill, passes through the filament removal station before being rolled up again. The filaments are removed and suctioned through the suction apparatus and then discharged into the appropriate container.

The infill removed from the synthetic turf strip proceeds to be conveyed to be dried and screened to be divided into groups, for example 3, of different size ranges. In particular, it is conveyed to the screening machine.

In the case of the screening machine in FIG. 5, the infill is poured into the inlet mouth while the drum screens rotate and the infill is fed into the machine for drying the infill. Due to the centrifugal force, gravity and the inclination of the drum screens, the infill passes through or runs over the screens and is divided into the different groups and exits the machine through the respective outlets 160,165,170. Thanks to the suction unit 175 and the hot air generation unit 155, the synthetic grass filaments (or at least part of them) and the dust are instead lifted from the inner drum screen and are transported by the air to the outlet mouth 160 without passing through the calibrated holes of the (inner) tubular screen to be then suctioned and treated in the filtering unit that allows the synthetic grass filaments to be obtained.

In the case of the screening machine in FIG. 6, the infill is poured into the inlet mouth while hot air is also fed into the box body 195 to dry the infill. The infill slides on the inclined flat screens and part of the granular bodies fall by gravity through the calibrated holes of the screen, while another part, larger in size, does not pass through the holes and flows along the inclined flat screens, or on the box body, to the respective outlet mouth 205,210,215. At the same time, the synthetic grass filaments (or at least part of them) are sucked up by the combined action of the suction unit and the hot air generation unit.

Regardless of the configuration of the screening machine, the output of the screening machine consists of the suctioned synthetic grass filaments and the (three) groups of granular material, each containing sand, polymeric granular material (and/or plant fibres) and synthetic grass filaments or granules thereof.

From the screening machine, said groups of granular material are brought to the respective densimetric separating machines 230 by means of corresponding bucket conveyors which pour the groups into the respective separating machines 305, from where the material then reaches the respective densimetric separating machine. In the separating machines 305, thanks to the suction unit 320 and the rods 315, another part of the filaments is removed from the infill. The remaining granular material falls by gravity between the bars.

The material of the granular material group passing through the separating machine 305 and arriving at the corresponding densimetric separating machine 230 is thus essentially the granular material exiting the respective outlet of the screening machine, but with fewer synthetic grass filaments inside.

The resulting granular material group arrives at the corresponding densimetric separating machine 230, where the different groups of material are separated from each other. Specifically, first the sand is separated from the polymeric material granules while the synthetic grass filaments float at a predetermined vertical height above the flat table, at a higher height than the other infill materials. This situation is illustrated schematically in FIG. 8. Once the sand and polymer granules have come out of the machine thanks to the rotary valves 240,245, the suction power is increased in order to suction the filaments floating on top of the table.

Without discussing those directly removed from the mat, at least a part of the filaments are removed from the still intact infill, which thus comprises materials belonging to a high dimensional variety (range), in the screening machine 130,130' subsequently at least another part of the filaments (if present, generally so) are removed from groups of granular material belonging to different smaller size ranges in the separating machines 305, in which no screening of the rest of the infill material takes place. And finally, the filaments are removed during a densimetric separation step in the machines 305.

By means of this combination of steps, the invention makes it possible to recover substantially all of the synthetic grass filaments, thanks to repeated suction operations of the filaments in successive steps, in which the filaments are mixed with granular material of different characteristics.

The suction of the filaments is assisted by the presence in several steps of the system of rods 225, 251 and 315 that retain the synthetic grass filaments.

The invention thus conceived is susceptible to several modifications and variations, all falling within the scope of the inventive concept.

Moreover, all details can be replaced by other technically equivalent elements.

In practice, the materials used, as well as the contingent shapes and sizes, can be whatever according to the requirements without for this reason departing from the scope of protection of the following claims.

The invention claimed is:

1. A method for recycling the infill of a synthetic turf, said infill being formed by a plurality of different granular materials, including at least sand granules, polymeric material granules and synthetic grass filaments, said method comprising the following steps:
   drying the infill,
   screening the infill through a plurality of successive screens each having passage holes of different sizes,
   subdividing the infill into a plurality of groups of granular material having different size ranges,
   conveying at least one group of granular material through a plurality of rods transverse to an advancement direction of the group of granular material, wherein the rods are made of an electrically insulating material and are connected to an electrical power source, and
   separating each group of granular material into two subgroups of granular material based on the difference in density of the materials.

2. The method according to claim 1, wherein during the drying,
   screening and separating steps according to the difference in density of the materials the step of suctioning the synthetic grass filaments is performed.

3. The method according to claim 1, wherein the step of conveying said at least one group of granular material comprises conveying said at least one group of granular material through a separating machine comprising:
   a chute having a plurality of bars parallel to each other and spaced apart by a predetermined amount,
   said plurality of rods rising vertically from the bars to form a comb transverse to said advancement direction of the group of granular material along the chute,
   a suction unit positioned at the rods.

4. The method according to claim 1, wherein the steps of drying and screening into groups occur simultaneously.

5. The method according to claim 4, wherein the screening step is performed by a screening machine of the rotating drum type having a cylindrical screen placed in rotation with respect to an axis of rotation substantially coaxial to an axis.

6. The method according to claim 4, wherein the screening step is performed by a screening machine comprising a flat screen inclined with respect to a horizontal plane.

7. The method according to claim 6, wherein the screening machine comprises said plurality of rods rising vertically from the flat screen to form a comb transverse to said advancement direction of the group of granular material along said screen.

8. The method according to claim 1, wherein the step of separating according to density comprises using a densimetric separating machine provided with a densimetric table above which a suction mouth is positioned connected to a suction unit whose power is adjustable, and wherein the method comprises:
   separating the sand from the polymeric material granules by means of the densimetric table while maintaining the power of the suction unit at a first predetermined threshold value at which the synthetic grass filaments float to a predetermined vertical height,
   once the separation of the sand from the polymeric material granules has been a completed and the materials have been conveyed outside the separating machine, operating the suction unit at a second predetermined power value higher than the first value in order to suction and convey towards an outlet the synthetic grass filaments that in the previous step were floating above the densimetric table.

9. The method according to claim 8, wherein the sand and polymeric material granules are conveyed outside the separating machine by means of rotary valves.

10. The method according to claim 9, comprising a box casing enclosing within the box casing a flat plate of the densimetric table and provided with:
    a supply mouth into which the group of granular material is poured,
    a first opening and a second opening occluded respectively by a first rotary valve and a second rotary valve of the densimetric separating machine itself
    a suction mouth placed vertically above the flat plate and forming part of a suction unit of the densimetric separating machine,
    in which the suction mouth, the supply mouth and the rotary valves and define the only passages in the box housing that allow communication between the external environment and the environment inside the box housing between the box housing itself and the flat table.

11. The method according to claim 1, wherein during the drying step the step of suctioning the synthetic grass filaments is performed.

12. The method according to claim 1, wherein the method includes also the step of making a suction unit available and activating the suction unit at a predetermined power to suction the synthetic grass filaments retained by the rods.

13. The method according to claim 1, wherein said rods are connected to a positive and a negative pole of said electrical power source.

14. The method according to claim 1, wherein the method further comprises conveying separate subgroups of granular materials to different collection containers.

* * * * *